(12) United States Patent
Koivunen et al.

(10) Patent No.: US 7,929,937 B2
(45) Date of Patent: Apr. 19, 2011

(54) SYSTEM AND METHOD FOR BLIND ESTIMATION OF MULTIPLE CARRIER FREQUENCY OFFSETS AND SEPARATION OF USER SIGNALS IN WIRELESS COMMUNICATIONS SYSTEMS

(75) Inventors: Visa Koivunen, Espoo (FI); Athina Petropulu, Bryn Maw, PA (US); H. Vincent Poor, Princeton, NJ (US); Yuanning Yu, Drexel Hill, PA (US)

(73) Assignee: The Trustees of Princeton University, Princeton, NJ (US)

( * ) Notice: Subject to any disclaimer, the term of this patent is extended or adjusted under 35 U.S.C. 154(b) by 810 days.

(21) Appl. No.: 11/923,161

(22) Filed: Oct. 24, 2007

(65) Prior Publication Data

US 2009/0111411 A1 Apr. 30, 2009

(51) Int. Cl.
*H04L 27/00* (2006.01)
*H04B 1/10* (2006.01)

(52) U.S. Cl. ........ 455/296; 370/208; 375/340; 375/346; 455/182.1; 455/226.1

(58) Field of Classification Search ............... 455/182.1, 455/182.2, 185.1, 226.1, 296; 370/208, 252; 375/260, 326, 341, 343, 340, 344, 355–375
See application file for complete search history.

(56) References Cited

U.S. PATENT DOCUMENTS

| | | | | |
|---|---|---|---|---|
| 6,757,344 B2* | 6/2004 | Carleton | ........................ | 375/341 |
| 6,882,694 B2* | 4/2005 | Olivier | ........................... | 375/346 |
| 7,505,523 B1* | 3/2009 | Lee et al. | ....................... | 375/260 |
| 7,515,657 B1* | 4/2009 | Lee et al. | ....................... | 375/326 |
| 7,539,272 B2* | 5/2009 | Chen et al. | ...................... | 375/340 |
| 7,643,566 B2* | 1/2010 | Hwang et al. | .................. | 375/260 |
| 7,742,392 B2* | 6/2010 | Ge et al. | .......................... | 370/208 |
| 7,796,711 B2* | 9/2010 | Heiman et al. | ................. | 375/341 |
| 7,809,083 B1* | 10/2010 | Wu et al. | ........................ | 375/316 |
| 7,809,091 B2* | 10/2010 | Zeng et al. | ..................... | 375/341 |
| 2006/0018412 A1* | 1/2006 | Jung et al. | ..................... | 375/341 |
| 2010/0027723 A1* | 2/2010 | Kim et al. | ...................... | 375/343 |

OTHER PUBLICATIONS

Yu, et al., "Blind Estimation of Multiple Carrier Frequency Offsets," Proceedings of the 18th Annual IEEE International Symposium on Personal, Indoor, and Mobile Radio Communications (PIMRC), Athens, Greece, Sep. 3-7, 2007 (8 pages; article submitted Jul. 3, 2007, and posted on http://arxiv.org/abs/0707.0463).

* cited by examiner

*Primary Examiner* — Blane J Jackson
(74) *Attorney, Agent, or Firm* — McCarter & English, LLP

(57) ABSTRACT

A system and method for blind estimation of carrier frequency offsets (CFOs) and separation of user signals in wireless communications systems are provided. Blind estimation of CFOs (i.e., without knowledge of the conditions of the transmitter or the transmission medium/channel) is carried out in order to improve reception quality by a wireless communications device. A received RF signal is over-sampled by a pre-defined over-sampling factor, and polyphase components are extracted from the over-sampled signal. The polyphase components are used to construct a virtual receiver output matrix, e.g., a model of the received signal and its associated output matrix. System response conditions are blindly estimated by applying a blind system estimation algorithm to the virtual receiver output matrix. A plurality of CFO estimates are obtained from the estimated system response conditions, and can be used by an equalizer to adjust receiver parameters in accordance with the CFO estimates so as to maximize reception quality and to extract multiple user signals from the received signal.

16 Claims, 7 Drawing Sheets

SYSTEM AND METHOD FOR BLIND ESTIMATION OF MULTIPLE CARRIER FREQUENCY OFFSETS AND SEPARATION OF USER SIGNALS IN WIRELESS COMMUNICATIONS SYSTEMS

STATEMENT OF GOVERNMENT INTERESTS

The present invention was made with government support under National Science Foundation Grant Nos. ANI-03-38807, CNS-06-25637, and CNS-04-35052, and Office of Naval Research Grant No. ONR-N-00014-07-1-0500. Accordingly, the Government has certain rights to the present invention.

BACKGROUND OF THE INVENTION

1. Field of the Invention

The present invention relates to wireless communications systems, and more particularly, to a system and method for blind estimation of multiple carrier frequency offsets and separation of user signals in wireless communications systems.

2. Related Art

In wireless communications systems, carrier frequency offsets (CFOs) represent a severe problem which can make data transmission highly unreliable. CFOs are often caused by two different factors, namely, carrier frequency mismatches between local oscillators (transmit and/or receive) of transceiver equipment, and Doppler shifts caused by moving transceiver equipment (e.g., mobile cellular telephones). Carrier frequency mismatches occur when transmitter and receiver local oscillators experience drifts from their nominal frequencies, resulting in an offset. In multiple antenna systems, each transmitter and receiver typically requires its own radio frequency—intermediate frequency (RF-IF) chain, resulting in each transmitter-receiver pair having its own CFO and associated mismatch parameter. This multiple frequency offset can occur in wireless sensor networks, as well as in multi-user and multi-antenna communications systems where multiple transceivers, positioned spatially apart from each other, are provided and do not share RF-IF chains.

In mobile wireless systems, Doppler shift of the received signal spectrum arises from relative motion between two transceivers (e.g., motion of a cellular telephone with respect to a base station). This shift depends on the carrier frequency, the velocity of the mobile terminal, and the angle of arrival of the received signal. Often, multiple-access wireless systems (e.g., systems with multiple user signals propagated over a shared communications channel, such as in CDMA systems) are used in demanding propagation environments with rich scattering and large angle spread. As a result, each channel branch introduces its own Doppler shift which requires compensation.

Uncompensated CFOs cause undesired channel variations, rotation of the received symbol constellations, and interference in adjacent channels. Compensation of CFOs is particularly important in multi-user and multi-antenna systems, where susceptibility to such problems is high. In such systems, the received signals represent co-channel signals that are mixed because of unknown channel conditions present in the transmission environment.

CFO compensation and signal separation processes are typically performed using training signals. However, such systems are impractical in systems with multiple transceiver pairs because of the need to provide a separate training signal for each transmitter-receiver pair, which is costly and time-consuming and reduces the effective data rates. Additionally, a multi-antenna system is usually required in order to compensate for multiple CFOs and to separate multiple user signals, which results in increased hardware costs. Other techniques for compensating for CFOs include decision feedback via a phase-locked loop (PLL, which uses knowledge of the transmitted constellation to adaptively track both the frequency and phase offset between the equalized signal and the known signal constellation), blind estimation of CFO and recovery of symbols using second-order cyclic statistics of an over-sampled, received signal, and pilot-based CFO estimation. However, such systems are impractical for CFO compensation and user separation in multi-user systems, and particularly, multi-user systems which utilize a single receive antenna.

Accordingly, what would be desirable, but has not yet been provided, is a system and method for blind estimation of multiple carrier frequency offsets and separation of user signals in wireless communications systems, which addresses the foregoing limitations of existing wireless systems.

SUMMARY OF THE INVENTION

The present invention relates to a system and method for blind estimation of carrier frequency offsets (CFOs) and separation of user signals in wireless communications systems. The present invention can be implemented as software installed in and executable by a wireless communications device (e.g., a cellular telephone, a wireless network transceiver, a multiple-input, multiple-output (MIMO) transceiver, etc.) having a radio frequency (RF) receiver and one or more receive antennas. The present invention allows for the blind estimation of CFOs (i.e., without knowledge of the conditions of the transmitter or the transmission medium/channel) in order to improve reception quality by a wireless communications device.

A received RF signal is over-sampled by the present invention by a pre-defined over-sampling factor. Polyphase components are then extracted from the over-sampled signal. The polyphase components are used to construct a virtual receiver output matrix, e.g., a model of the received signal and its associated output matrix. System response conditions are blindly estimated by applying a blind system estimation algorithm to the virtual receiver output matrix. A plurality of CFO estimates are then obtained from the estimated system response conditions, and can be used by an equalizer operatively associated with the receiver to adjust receiver parameters so as to maximize reception quality and to extract multiple user signals from the received signal.

BRIEF DESCRIPTION OF THE DRAWINGS

The foregoing features of the invention will be apparent from the following Detailed Description of the Invention, taken in connection with the accompanying drawings, in which.

DETAILED DESCRIPTION OF THE INVENTION

The present invention provides a system and method for blind estimation of carrier frequency offsets (CFOs) and separation of user signals in wireless communications systems. Blind estimation of CFOs is provided (i.e., without knowledge of the conditions of the transmitter or the transmission medium/channel) in order to improve reception quality by a wireless communications device. A received RF signal is over-sampled by the present invention by a pre-defined over-sampling factor, and polyphase components are then extracted from the over-sampled signal. The polyphase components are used to construct a virtual receiver output matrix, e.g., a model of the received signal and its associated output matrix. System response conditions are blindly estimated by applying a blind system estimation algorithm to the virtual receiver output matrix. A plurality of CFO estimates are then obtained from the estimated system response conditions, and can be used by an equalizer operatively associated with the receiver to adjust receiver parameters in accordance with the CFO estimates so as to maximize reception quality, and to extract multiple user signals from the received signal.

Figure 1:
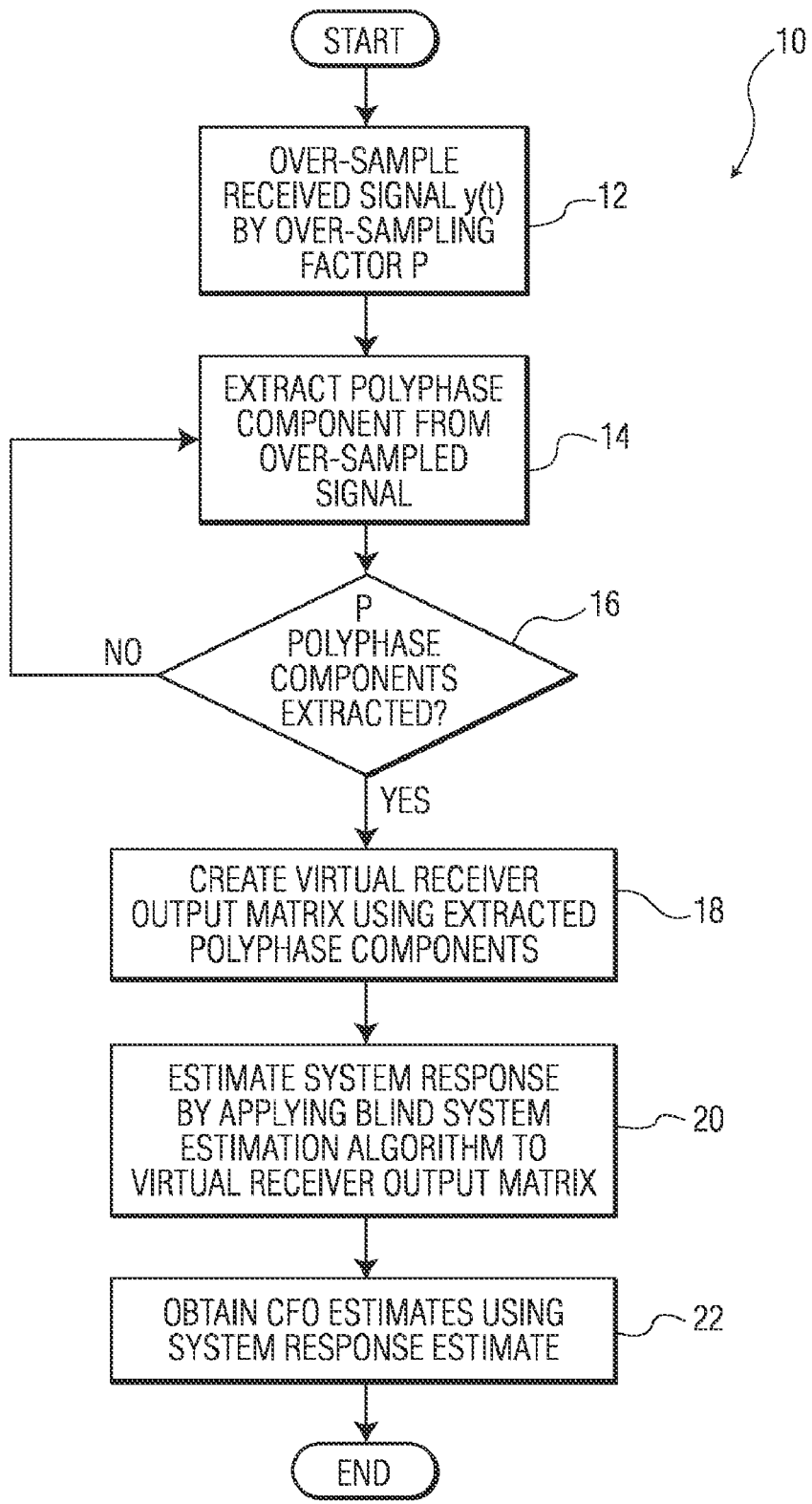
FIG. 1 is a flowchart showing processing steps of the present invention for blind estimation of multiple carrier frequency offsets and separation of user signals from a received signal.

FIG. 1 is a flowchart showing processing steps of the present invention, indicated generally at 10, for blind estimation of multiple carrier frequency offsets in a multi-user, wireless communications system, and for separation of individual user signals from a received signal. The processing shown in FIG. 1 can be utilized to blindly estimate CFOs in multi-user wireless communications systems having a single, or multiple, receive antennas, including, but not limited to, cellular telephone systems, wireless data and voice transmission systems (e.g., multiple-input, multiple-output (MIMO) transceiver systems, code-division, multiple-access (CDMA) systems, etc.), and wireless networks.

Beginning in step 12, a received radio signal $y(t)$ is over-sampled by an over-sampling factor P. The received signal $y(t)$ represents a continuous-time, base-band signal which can be expressed mathematically as follows:

$$y(t) = \sum_{k=1}^{K} a_k x_k(t - \tau_k) e^{j2\pi F_k t} + w(t) \quad (1)$$

In Equation 1 listed above, $a_k$ represents the effect of channel fading between the k-th user and the base station and also contains the corresponding phase offset, $\tau_k$ is the delay associated with the path between the k-th user and the base station, $F_k$ is the CFO of the k-th user, $w(t)$ represents noise, $x_k(t)$ denotes the transmitted signal of user k: $x_k(t)=\Sigma_i s_k(i)p(t-iT_s)$ where $s_k(i)$ is the i-th symbol of user k, $T_s$ is the symbol period, and $p(t)$ is a pulse function with support $[0,T_s]$. The received signal $y(t)$ is sampled at a rate of $1/T=P/T_s$, where the over-sampling factor P is an integer. Preferably, the over-sampling factor P is greater than or equal to the number of user signals to be separated from the received signal.

In order to guarantee that all users' pulses overlap at the sampling times, the over-sampling period should satisfy the condition $T_s/P \geq \tau_k$, $k=1, \ldots K$, which means that the over-sampling factor P is upper bounded by $T_s/\min\{\tau_1, \ldots, \tau_k\}$. If $t=iT_s+mT$, $m=1, \ldots, P-1$ denotes the sampling times, then the over-sampled signal can be expressed as $$y_m(i) = y(iT_s + mT) \quad (2)$$

$$= \sum_{k=1}^{K} a_k e^{j2\pi f_k(iP+m)} x_k\left(\left(i + \frac{m}{P}\right)T_s - \tau_k\right) + w\left(\left(i + \frac{m}{P}\right)T_s\right)$$

$$= \sum_{k=1}^{K} a_{m,k}(s_k(i)e^{j2\pi f_k iP}) + w\left(i + \frac{m}{P}\right), m = 1, \ldots, P-1 \quad (3)$$

where $f_k=F_k T_s/P$, $(|f_k| \geq 0.5)$ is the normalized frequency offset between the k-th user and the base (transmitting) station, and the m–k$^{th}$ element of the virtual multiple-input multiple-output (MIMO) channel matrix A is given as $$a_{m,k} = a_k e^{j2\pi m f_k} p\left(\frac{m}{P}T_s - \tau_k\right), m = 1, \ldots, P-1 \quad (4)$$

In steps 14 and 16, P polyphase components are extracted from the over-sampled signal. The signal $y_m(i)$, $i=0, 1, \ldots$ of Equation 2 is referred to as the m-th polyphase component of $y(i)$, $i=0, 1, \ldots$ In step 18, a virtual receiver output matrix is created using the extracted polyphase components. Defining $y(i) \triangleq [y_1(i), \ldots, y_P(i)]^T$; $A=\{a_{m,k}\}$, a tall matrix of dimension $P \times K$; $\tilde{s}(i) \triangleq [s_1(i) e^{j2\pi f_1 iP}, \ldots s_k(i) e^{j2\pi f_K iP}]^T$; and $$w(i) \triangleq \left[w\left(i+\frac{1}{P}\right), \ldots, w\left(i+\frac{P}{P}\right)\right]^T,$$

(for simplicity of notation, the factor $T_s$ in the argument of $w(.)$ has been omitted, but it is noted that this factor is implicitly included in the model) then Equation 3 can be written in matrix form as $$y(i)=A\tilde{s}(i)+w(i) \quad (5)$$

Equation 5 represents a virtual multiple antenna model of the received signal over-sampled in step 12, where each polyphase component of the received signal functions as a virtual antenna measurement for each antenna of the virtual multiple antenna model.

In step 20, the overall system response is estimated by applying a blind system estimation algorithm to the virtual receiver output matrix created in step 18. The following assumptions are made in order to estimate the system response:

1. Assumption A1: For each $m=1 \ldots P$, $w_m(.)$ is a zero-mean Gaussian stationary random process, and is independent of the inputs;
2. Assumption A2: For each k, $s_k(.)$ is a zero mean, independent and identically distributed (i.i.d.) sequence with nonzero kurtosis, i.e., $\gamma_{s_k}^4=\text{Cum}[s_k(i), s^*_k(i), s_k(i), s_k(i)] \neq 0$. The sequences $s_k$ are also mutually independent, allowing for the assumption that every user has unit transmission power, then $C_s=I$; and
3. Assumption A3: The over-sampling factor P is no less than K.

Under Assumption A2, the rotated input signals $\tilde{s}_k(.)$ are easily verified as also being zero mean, i.i.d. and with nonzero kurtosis. Also, the $\tilde{s}_k(i)$'s are mutually independent for different k's. Assumption A3 guarantees that the virtual MIMO channel matrix A in Equation 5 has full rank with probability one. If the delays of the users are randomly distributed in the interval $[0, T_s/P)$, then each row of the channel matrix can be viewed as having been drawn randomly from a continuous distribution. Thus, the channel matrix has full rank with probability one.

In step 22, CFO estimates are calculated using the system response estimate created in step 20. Any suitable blind source separation algorithm can be applied to the results of Equation 5 to obtain $$\hat{\underline{A}} \triangleq AP\Lambda \quad (6)$$

Subsequently, using any suitable type of equalizer (such as a least-squares equalizer: $\hat{s}(i)=(\hat{A}^H\hat{A})^{-1}\hat{A}^Hy(i)=e^{jArg\{-\Lambda\}}|\Lambda|^{-1}P^T\tilde{s}(i)$, or other suitable equalizer), an estimate of the user signals can be derived in the form of $$[/\$]\$\tilde{~}\$\$[/\$]\$\tilde{~}A\tilde{x}\tilde{s}_k(i) = s_k(i)e^{j(-\theta_k + 2\pi f_k iP)} \quad (7)$$

If a least-squares equalizer is used, Equation 7 can be derived by denoting $\theta_k$ as the k-th diagonal element of $Arg\{\Lambda\}$.

At this point, any single CFO estimation method could be applied to $\hat{s}_k(i)$ to compensate for $f_k$. An estimate of $f_k$ can be obtained based on the channel matrix estimate. The phase of the channel matrix $\hat{A}$ equals $$\Psi = Arg\hat{A} = \begin{pmatrix} 2\pi f_1 + \phi_1 & \cdots & 2\pi f_K + \phi_K \\ \vdots & \ddots & \vdots \\ 2\pi f_1 P + \phi_1 & \cdots & 2\pi f_K P + \phi_K \end{pmatrix} P \quad (8)$$

where $\phi k = Arg\{a_k\} + \theta_k$, which accounts for both the phase of $a_k$ and the estimated ambiguity in Equation 7. One can clearly see that the i-th column of $\Psi$ is directly related to $f_i$, and thus can be used to estimate $f_k$. A least-squares method for obtaining an estimate of $f_k$ can be used, according to the following equation:

$$\hat{f}_k = \frac{1}{2\pi} \frac{P\left(\sum_{p=1}^{P} p\Psi_{p,k}\right) - \left(\sum_{p=1}^{P} p\right)\left(\sum_{p=1}^{P} \Psi_{p,k}\right)}{P\left(\sum_{p=1}^{P} p^2\right) - \left(\sum_{p=1}^{P} p\right)^2} \quad (9)$$

where $\hat{f}_k = f_k + \epsilon_k$ and $\epsilon_k$ represents the estimation error.

The de-coupled signals $\hat{s}_j(i)$ in Equation 7 are shuffled in the same manner as the estimated CFOs. As a result, the estimated CFOs can be used to compensate for the effect of CFO in the de-coupled signals in Equation 8, and to obtain estimates of the input signals as $\hat{s}(i) = e^{jArg\{-A\}}P^Ts(i)$.

Optionally, compensation for residual errors in the estimated CFOs can be obtained by applying a phase-locked loop (PLL) to the recovered signals $\hat{s}_j(i)$ in $\hat{s}_k(i) = s_k(i)e^{j(-\theta_k - 2\pi\epsilon_k iP)}$ so as to further mitigate the effect of residuary CFO $\epsilon_k$. For quadrature amplitude modulation (4QAM) signals, as long as $|P\epsilon_k| < 1/8$, residuary effects can be removed. Thus, the CFO estimation techniques of the present invention can prevent the symmetric ambiguity of the PLL, and can also greatly reduce the convergence time of the PLL. From Equation 8, it can be seen that the CFO estimator will achieve full acquisition range for the normalized CFO, i.e., $|f_k| < 1/2$, which means all continuous CFOs in the range of $F_k < P/(2T_s)$ can be processed.

The processing shown in FIG. 1 thus allows for the blind estimation of multiple CFOs from a single received signal, using one or more receive antennas. This allows for compensation of CFOs without knowledge of the transmitting constellation, so as to improve reception performance. The processing of FIG. 1 also allows for the separation of individual user signals (channels) from a single received signal.

Figure 2:
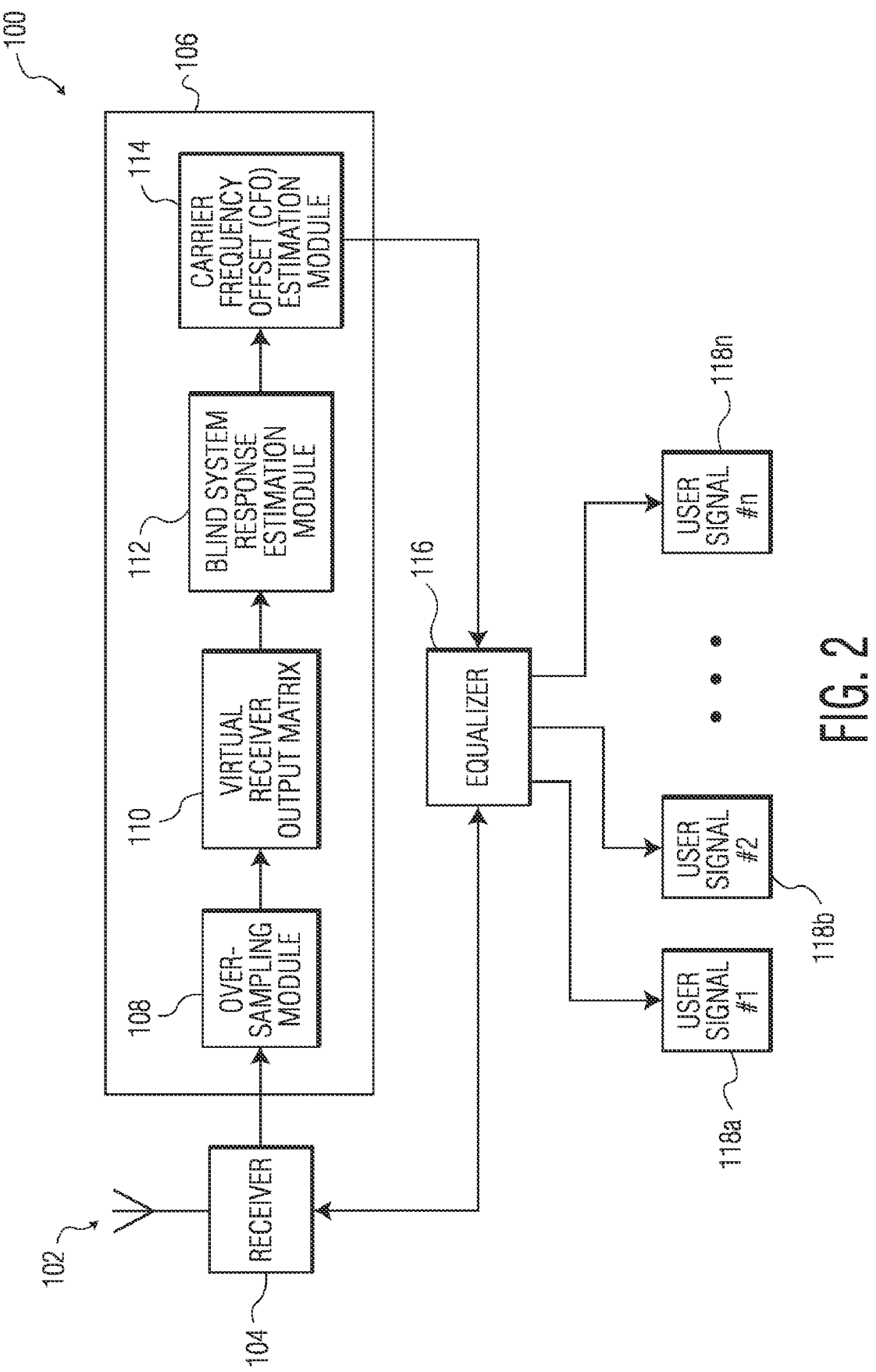
FIG. 2 is a block diagram showing sample hardware and software components of the present invention for blind estimation of multiple carrier frequency offsets and separation of user signals using a single receive antenna.

FIG. 2 is a block diagram showing hardware and software components of the present invention, indicated generally at 100. The present invention is operable with any suitable digital transceiver equipment (such as a CDMA digital cellular telephone, a MIMO transceiver, a wireless network transceiver, or other suitable equipment) which includes an antenna 102 and a receiver 104. The antenna 102 could be a single antenna, or an array of antennas. The processing steps of FIG. 1 could be embodied as software components 106 executable by an integrated circuit (e.g., a microcontroller, microprocessor, digital signal processor (DSP), etc.) in communication with the receiver 104. The modules 106 include an over-sampling module 108 for over-sampling a radio frequency (RF) signal received by the receiver 104, extracting polyphase components from the sampled RF signal, and producing a virtual channel output matrix 110, which represents a virtual, multi-antenna model of the received and over-sampled signal. The virtual channel output matrix 110 could then be processed by a blind system estimation module 112 which produces an estimate of system response conditions as described herein. A CFO estimation module 114 processes the estimated system response conditions of the virtual channel output matrix 110 to produce a plurality of CFO estimates. The CFO estimates are used by an equalizer 116 to separate individual user signals 118a-118n (n being any desired number) from the received signal. Parameters of the receiver 104 could be adjusted by the equalizer 116, in real time, to adapt to varying reception conditions. The modules 106 thus allow for the blind estimation of multiple CFOs using one (or more) receiver antennas to compensate for CFOs, and for the separation of user signals from the received signal.

The present invention was tested using software simulations, wherein the channel coefficients $\alpha_k$, k=1, ..., K are zero-mean Gaussian random variables. The waveform p(.) is the Hamming window. The continuous CFOs were randomly chosen in the range $[-1/2T_s, 1/2T_s)$. The delays, $T_k$, k=1, ..., K were chosen to be uniformly distributed in the range of $[0, T_s/P)$. The input signals were 4QAM signals, and the estimation results were averaged over 300 independent channels, with 20 Monte-Carlo runs for each channel. The blind source separation algorithm used was the JADE method, which is available via the Internet at the website http://www.tsi.enst.fr/~cardoso/guidesepsou.html.

Figure 3:
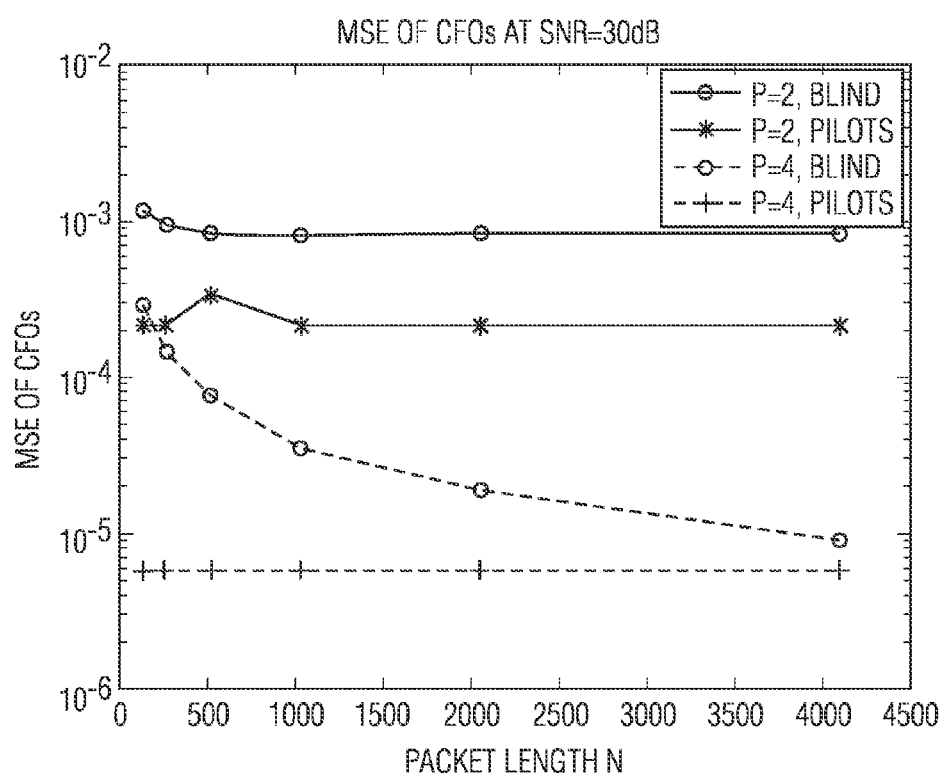
FIGS. 3-7 are graphs of computer-simulated performance of the present invention in comparison to known, pilots-based CFO estimation techniques (FIGS. 3-6) and to Cramer-Rao lower bounds (CRBs) (FIG. 7).

The performances of known, pilots-based CFO compensation methods ("pilots") and the present invention ("blind") were tested using different data lengths, and signal-to-noise ratios (SNRs) were set to 30 dB. For the pilots method, each user transmitted a pilot signal of length 32, and the pilots were random sequences uncorrelated between different users. As shown in FIG. 3, the mean squares error (MSE) for the CFO estimator discussed above in connection with Equation 9 is illustrated for different values of the over-sampling factor P. The MSE is calculated based on $$\frac{1}{K}\sum_{k=1}^{K}\left[(\hat{f}_k - f_k)P\right]^2 = \frac{1}{K}\sum_{k=1}^{K}\left[(\hat{F}_k - F_k)T_s\right]^2.$$

It can be seen that by increasing P (i.e., from 2 to 4), more accurate CFO estimates can be obtained.

Figure 4:
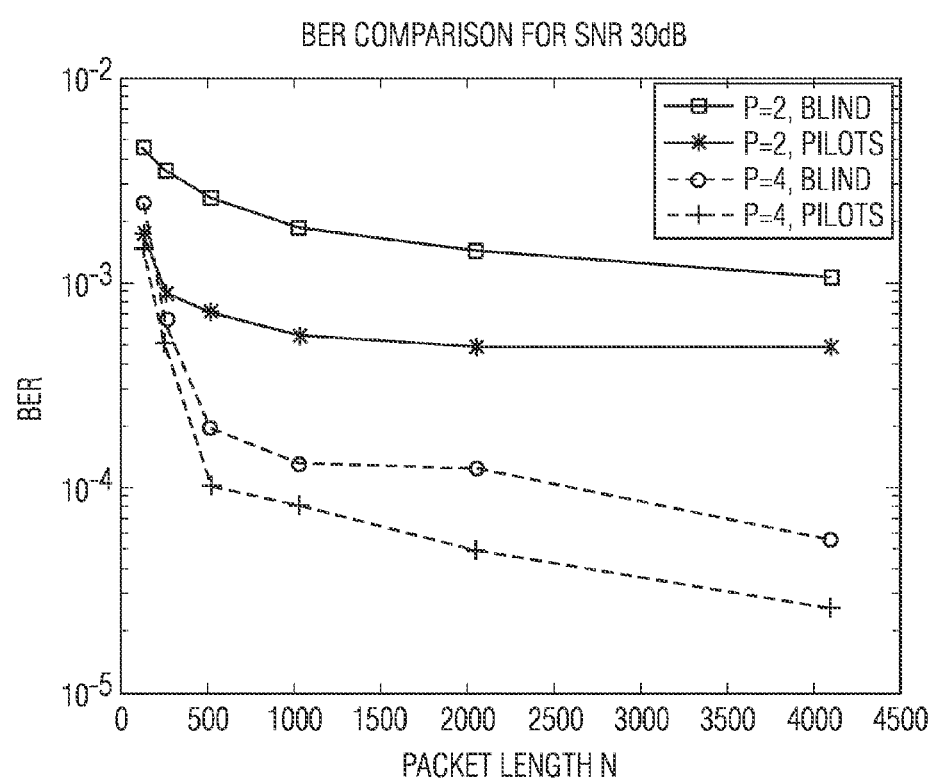

As shown in FIG. 4, computer simulations of bit-error rates (BER) for CFO estimates generated by the present invention versus known, pilots-based techniques are shown, for different values (i.e., 2 and 4) of the over-sampling factor P. For both the present invention and the pilots-based techniques, the BER is calculated based on the recovered signals after processing by a PLL. As can be seen, the BER performance improves by increasing the over-sampling factor P. As a result, the present invention is suitable for improving performance in long and short data lengths.

Figure 5:
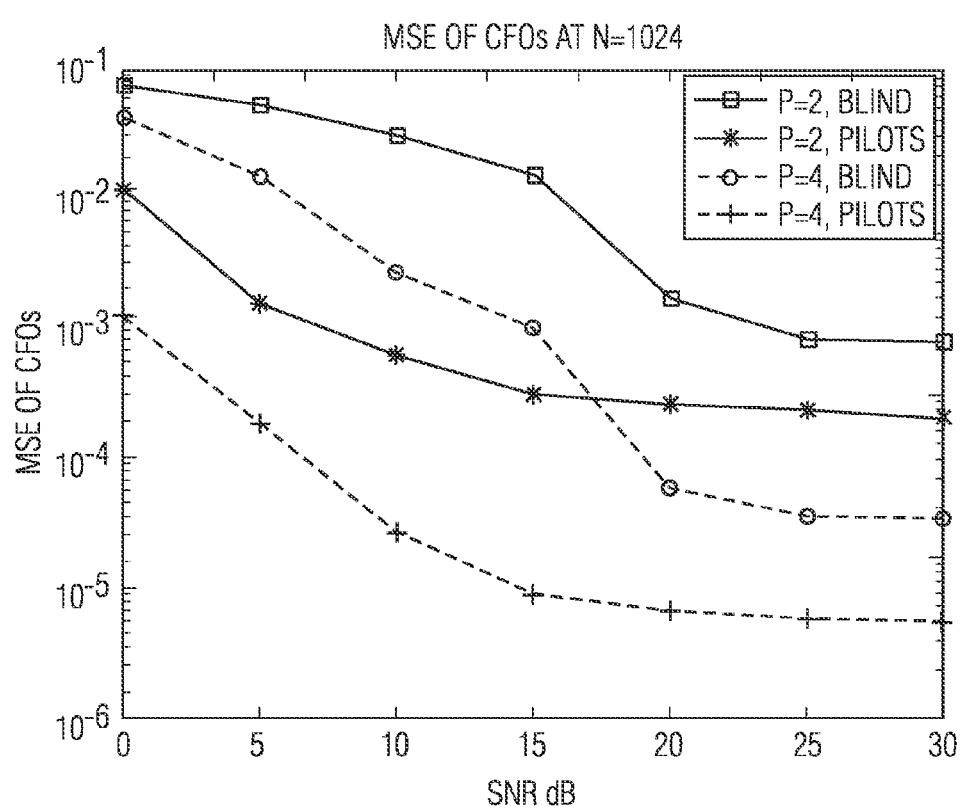
Figure 6:
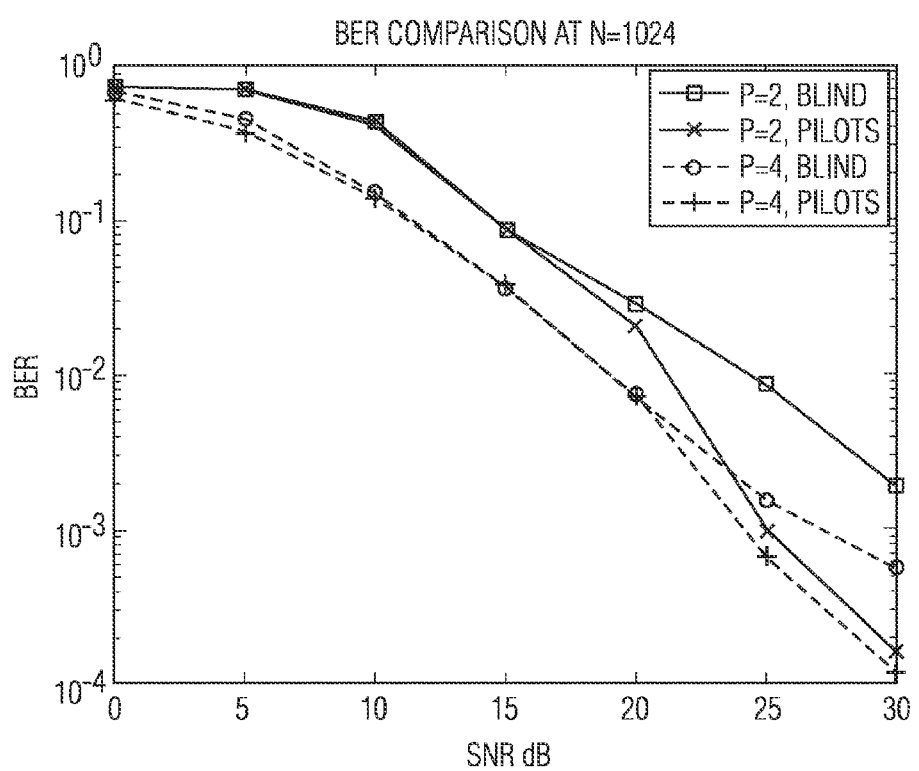

FIGS. 5 and 6 show computer simulations of MSE and BER for the present invention and pilots-based techniques, where the packet length N was set to 1024 and various noise levels were tested. The MSE of the blind CFO estimation technique discussed above in connection with Equation 9 is illustrated in FIG. 5, as well as the MSE of pilots-based techniques. As shown, by increasing the over-sampling factor P, more accurate estimates of CFOs are obtained. As shown in FIG. 6, the BER for the present invention and pilots-based techniques are shown, with packet length N set to 1024. It can be seen that the present invention has almost the same performance as the pilots-based techniques for SNRs below 20 dB.

To evaluate the large sample performance of the present invention, Cramer-Rao lower bounds were established and computer simulations were performed on the present invention. The Cramer-Rao lower bound gives a lower bound on variance that any unbiased estimator may attain. Using central limit theory arguments, the received signals y can be approximated as complex Gaussian signals, with zero mean, and the covariance matrix is given by $$C_y = AC_s A^H + \sigma_w^2 I = AA^H + \sigma_w^2 I \quad (10)$$

The covariance matrix is valid under Assumptions A1 and A2 above. The Gaussian assumption of the received signal is reasonable since the received signal is a linear mixture of i.i.d. signals.

Let $$\alpha = [f^T, \rho^T, \sigma_w^2]^T \quad (11)$$

where $f^T = [f_1, \ldots, d^K]^T$ is the vector of unknown CFOs, and $\rho^T = [\tau_1, \ldots, \tau_K]^T$ is the vector of random delays. The CFOs are represented by f, while $\rho$ and $\sigma_w^2$ are nuisance parameters. Under Assumptions A1-A3 above and the Gaussian approximation, the Fisher Information Matrix (FIM) for the parameter vector $\alpha$ is given by $$FIM_{l,n} = TTr\left(\frac{\partial C_y}{\partial \alpha_l} C_y^{-1} \frac{\partial C_y}{\partial \alpha_n} C_y^{-1}\right), l, n = 1, \ldots, 2K+1 \quad (12)$$

To obtain the CFO parameter f, the following derivation is applied:

$$\frac{1}{T} CRB^{-1}(f) = G^H G - G^H \Delta (\Delta^H \Delta)^{-1} \Delta^H G - G^H \Pi_\Delta^\perp G \quad (13)$$

where G and $\Delta$ are defined as:

$$\frac{1}{T} FIM = \left(\frac{\partial c_y}{\partial \alpha^T}\right)^H (C_y^T \otimes C_y^{-1}) \left(\frac{\partial c_y}{\partial \alpha^T}\right) = \begin{bmatrix} G^H \\ \Delta^H \end{bmatrix} [G \, \Delta] \quad (14)$$

where $c_y = vec(c_y)$ is a $P^2 \times 1$ vector constructed from columns of $C_y$, and G is a dimension of $P^2 \times K$, while $\Delta$ is of dimension $P^2 \times (K+1)$. To proceed, evaluation of the derivatives of $C_y$ with respect to $\alpha$ is required. Considering $\partial c_y / \partial f^T$, it holds that $$\frac{\partial c_y}{\partial f_k} = vec\left(\frac{\partial C_y}{\partial f_k}\right) = vec([0 \ldots d_k \ldots 0]A^H + A[0 \ldots d_k^H \ldots 0]^T) \quad (15)$$

with $$d_k = \frac{j2\pi f_k}{P}(a_k \odot [1, \ldots, P]^T),$$

where $\odot$ is the Hadamard matrix product.

Similarly, $\partial c_y / \partial \rho^T$ can be obtained using the following equation:

$$\frac{\partial c_y}{\partial \tau_k} = vec\left(\frac{\partial C_y}{\partial \tau_k}\right) = vec([0 \ldots e_k \ldots 0]A^H + A[0 \ldots e_k^H \ldots 0]^T) \quad (16)$$

with $$e_k = \left[e^{2\pi \frac{f_k}{P}} \frac{\partial p\left(\frac{T_s}{P} - \tau_k\right)}{\tau_k}, \ldots, e^{2\pi f_k} \frac{\partial p(T_s - \tau_k)}{\tau_k}\right]^T.$$

This results in $\partial c_y / \partial \sigma_w^2 = vec(C_y^{-1})$ and allows for evaluation of the Cramer-Rao lower bound (CRB) using Equation 16 above.

Figure 7:
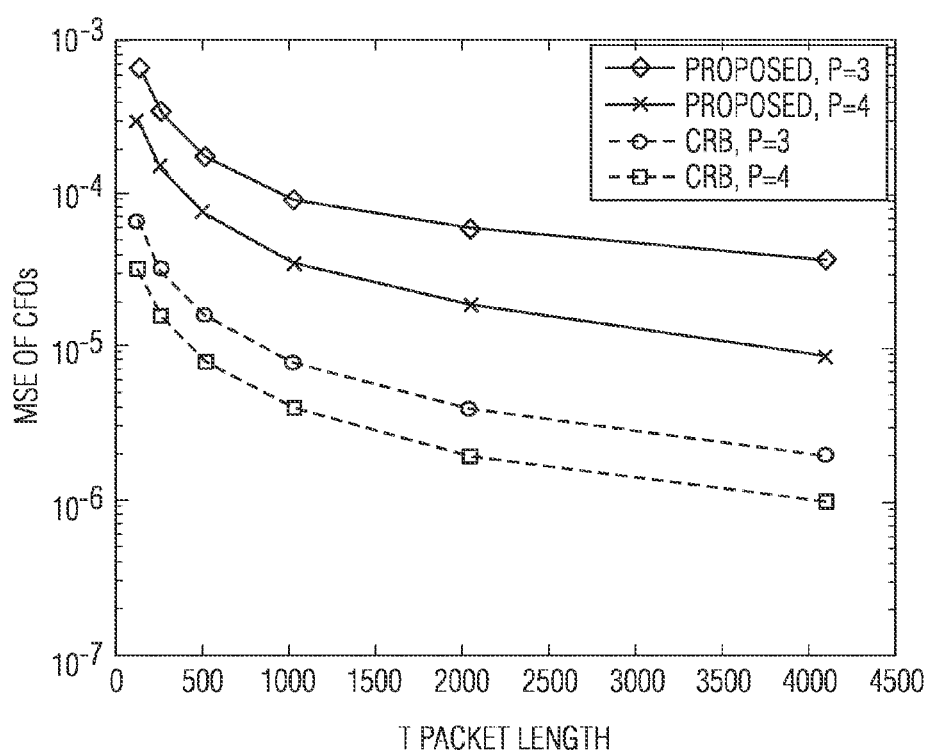

FIG. 7 is a graph showing the MSE using the CFO estimation technique of the present invention discussed above in connection with Equation 9, plotted against the stochastic CRB. Shown in the graph are plots of the MSE of the CFOs (labeled in the legend as "proposed") using over-sampling factors (P) of 3 and 4, plotted against the CRB using over-sampling factors of 3 and 4. It can be seen that the MSE curves are similar to the CRB curves, and no error floor is presented in the plots. As a result, there is no apparent bias in the estimates, and the gap is due to excess variance in the estimates, which could be due to the assumption of knowledge of the exact channel structure in the derivation of the CRB, i.e., the waveform used in transmission, which reduces the number of unknown parameters. However, in computer simulations, no additional assumptions about the channel structure are made.

It is noted that the use of a PLL, although not required, improves symbol recovery. To make sure that the PLL does not have symmetrical ambiguities, there must be a guarantee that $|P \pm_k| = |(\ddot{F}_k - F_k) T_s| \leq \frac{1}{8}$ for 4QAM transmissions. Thus, on average, the minimum tolerable MSE for the CFO is on the order of $10^{-2}$. From the computer simulations discussed above, it can be seen that the CFO compensation achieved by the present invention is sufficient for practical systems and commonly used modulation schemes.

Having thus described the invention in detail, it is to be understood that the foregoing description is not intended to limit the spirit or scope thereof. What is desired to be protected is set forth in the following claims.

What is claimed is:

1. A method for blind estimation of carrier frequency offsets in a received signal, comprising the steps of:
   receiving a radio signal;

sampling the radio signal for a pre-determined number of samples;

extracting polyphase components from the radio signal;

creating a virtual receiver output matrix using the polyphase components;

estimating system response characteristics using the virtual receiver output matrix; and estimating at least one carrier frequency offset using the estimated system response characteristics.

2. The method of claim 1, further comprising adjusting receiver parameters utilizing the estimated carrier frequency offset to improve reception quality.

3. The method of claim 2, further comprising extracting a user signal from the radio signal using the estimated carrier frequency offset.

4. The method of claim 1, wherein the step of receiving the radio signal further comprises receiving the radio signal with a single receive antenna.

5. The method of claim 1, wherein the step of sampling the radio signal comprises sampling the radio signal by an over-sampling factor P which is greater than or equal to a total number of users of the radio signal.

6. The method of claim 1, further comprising removing residual carrier frequency offsets from the radio signal using a phase-locked loop (PLL).

7. The method of claim 1, wherein the step of creating the virtual receiver output matrix comprises creating a model of a virtual multiple antenna system.

8. The method of claim 7, wherein the step of creating the virtual multiple antenna system comprises creating virtual antenna measurements corresponding to each antenna of the virtual multiple antenna system.

9. A system for blind estimation of carrier frequency offsets in a received signal, comprising:

a sampling module for sampling a received radio signal for a predetermined number of samples, extracting polyphase components from the radio signal, and producing a virtual channel output matrix;

a system estimation module for processing the virtual channel output matrix to produce an estimate of system response characteristics; and a carrier frequency offset module for estimating at least one carrier frequency offset using the estimated system response characteristics.

10. The system of claim 9, further comprising a receiver for receiving the radio signal.

11. The system of claim 10, further comprising an equalizer for adjusting parameters of the receiver utilizing the estimated carrier frequency offset to improve reception quality.

12. The system of claim 11, wherein the equalizer extracts a user signal from the radio signal using the estimated carrier frequency offset.

13. The system of claim 9, wherein the sampling module samples the radio signal by an over-sampling factor P which is greater than or equal to a total number of users of the radio signal.

14. The system of claim 9, further comprising a phase-locked loop (PLL) for removing residual carrier frequency offsets from the radio signal.

15. The system of claim 9, wherein virtual receiver output matrix comprises a model of a virtual multiple antenna system.

16. The system of claim 15, wherein the virtual multiple antenna system includes virtual antenna measurements corresponding to each antenna of the virtual multiple antenna system.

* * * * *

UNITED STATES PATENT AND TRADEMARK OFFICE
CERTIFICATE OF CORRECTION

| | | |
|---|---|---|
| PATENT NO. | : 7,929,937 B2 | Page 1 of 2 |
| APPLICATION NO. | : 11/923161 | |
| DATED | : April 19, 2011 | |
| INVENTOR(S) | : Visa Koivunen et al. | |

It is certified that error appears in the above-identified patent and that said Letters Patent is hereby corrected as shown below:

Column 5, lines 11 and 12, the equation should be deleted and replaced with

" $\hat{\tilde{s}}(i) = (\hat{A}^H \hat{A})^{-1} \hat{A}^H y(i) = e^{j Arg\{-\Lambda\}} |\Lambda|^{-1} P^T \tilde{s}(i)$ ."

Column 5, line 15, the equation should be deleted and replaced with

" $\hat{\tilde{s}}_k(i) = s_k(i) e^{j(-\theta_k + 2\pi f_k iP)}$ ."

Column 5, line 20, delete the equation and replace with " $\hat{\tilde{s}}_k(i)$ ."

Column 5, line 20, delete the word "off" and replace with "of $f_k$."

Column 5, line 46, delete the equation and replace with " $\hat{\tilde{s}}_j(i)$ ."

Column 5, line 50, delete the equation and replace with

" $\hat{s}(i) = e^{j Arg\{-\Lambda\}} P^T s(i)$ ."

Column 5, line 53, delete the equation and replace with

" $\hat{s}_k(i) = s_k(i) e^{j(-\theta_k - 2\pi \epsilon_k iP)}$ ."

Column 5, line 56, delete the equation and replace with "$|P\epsilon_k|<1/8$."

Column 7, line 40, in the equation, delete the letter "d" and replace with the letter "$f$."

Signed and Sealed this
Twenty-fourth Day of April, 2012

David J. Kappos
*Director of the United States Patent and Trademark Office*

CERTIFICATE OF CORRECTION (continued)
U.S. Pat. No. 7,929,937 B2

Column 7, line 56, delete the equations and replace with

"$\frac{1}{T}\text{CRB}^{-1}(\mathbf{f}) = \mathbf{G}^H\mathbf{G} - \mathbf{G}^H\mathbf{\Delta}(\mathbf{\Delta}^H\mathbf{\Delta})^{-1}\mathbf{\Delta}^H\mathbf{G} = \mathbf{G}^H\Pi_\Delta^\perp\mathbf{G}$"

Column 8, line 2, delete the equation and replace with "$\partial \mathbf{c}_y / \partial \mathbf{f}^T$"

Column 8, line 53, delete the equation and replace with

"$|P\epsilon_k| = |(\hat{F}_k - F_k)T_s| < 1/8$"